Figure 1:
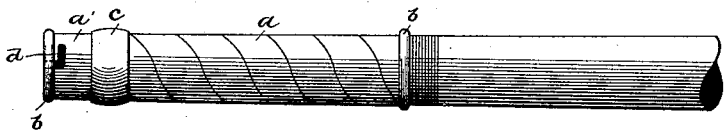

(No Model.)

T. KIRKER.
FISHING ROD JOINT.

No. 373,561. Patented Nov. 22, 1887.

Witnesses
Jno. G. Hinkel Jr.
Sidney L. Johnson

Thomas Kirker  Inventor
By his Attorneys
Foster & Freeman

UNITED STATES PATENT OFFICE.

THOMAS KIRKER, OF BELFAST, COUNTY OF ANTRIM, IRELAND.

FISHING-ROD JOINT.

SPECIFICATION forming part of Letters Patent No. 373,561, dated November 22, 1887.

Application filed April 14, 1887. Serial No. 234,815. (No model.) Patented in England May 14, 1885, No. 5,915.

*To all whom it may concern:*

Be it known that I, THOMAS KIRKER, of Castle Arcade, in the town of Belfast and county of Antrim, in Ireland, have invented certain new and useful Improvements in Fishing-Rod Joints, (for which I have received British Letters Patent No. 5,915, under date of May 14, 1885,) of which the following is a specification.

The object of my invention is to get rid of the stiffness of the ordinary ferrule and to secure the flexibility attained by the lapped splice now frequently employed for connecting the pieces of which fishing-rods are commonly made up, combined with the advantage of being easily and quickly put together or taken asunder when required. For this purpose I construct a spiral band or spiral bands of metal, or a spiral coil or spiral coils of wire projected into the form of a slightly-tapered tube to fit closely round the adjoining pieces of the fishing-rod; and I employ this tapered spiral tube at every joint, so that all the pieces of which the rod is made up may be separable according to the usual practice. One of these tapered spiral tubes I fix upon or attach to the rod at each joint by means of a pin and lapping, or other ordinary means, the wider part of the tube being preferably so fixed upon the lower or thicker piece of the rod, and the higher or thinner piece of the rod being left free for connection or removal when putting the rod together or taking it asunder. I encircle each end of the tapered spiral tube with an external ferrule or ring, and I prolong the free end with a piece of plain tube, which makes it fit more firmly upon the higher or thinner piece of the rod, and this piece may be held in connection with the tapered spiral tube, while necessary, by means of a threaded or spring catch or other ordinary mechanical appliance or contrivance; but the arrangement I prefer to employ consists in the use of a stud attached to or fixed upon the higher or thinner piece of the rod at a point at which, when the pieces are in proper connection, it will pass through a longitudinal slot or groove into a transverse slot or groove cut in the plain tube, or what is commonly known at the "bayonet-catch," where it is held when turned aside and out of the line of the longitudinal slot or groove. Where the tapered spiral tube is constructed of a coil or coils of wire, I may find it necessary to modify its flexibility by the use of an additional collar or ring, or additional collars or rings, placed externally between the terminal ferrules or rings or at intervals between said ferrules or rings. The adjoining ends of the pieces of the rod may be united within the tapered spiral tube by the formation of scarf-joints or of a tapered counter, plug, or tenon on the end of the higher or thinner piece and a correlative bore, cavity, or socket in the end of the lower or thicker piece to receive the tapered counter, plug, or tenon; but I prefer to fix a pin or wire in the end of the lower piece, which projects and fits into a bore or socket in the higher piece, and I place an external collar or ring on the tapered tube opposite the part touched internally by the extremities of the contiguous pieces of the rod when they are in proper connection in order to give strength and firmness to the joint. A corresponding collar or ring may be placed at a similar distance from the other end of the tapered spiral tube for additional firmness or uniformity of appearance; and in order that my said invention may be more fully understood, I shall now proceed to describe the drawings upon the sheet hereto annexed, the same letters of reference indicating the same or corresponding parts of my said invention throughout the figures upon said sheet.

Figure 2:
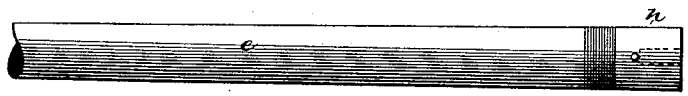
Figure 3:
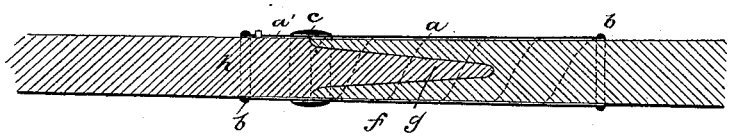
Figure 4:
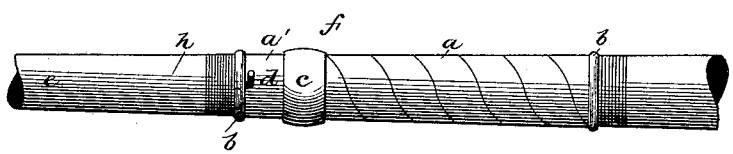

Figure 1 is a view of the end of the lower piece of a fishing-rod with a spiral metal band in the form of a tapered tube and prolonged with a piece of plain tube attached to it, the groove or slot to receive the stud on the upper piece of the rod and the external ferrule or ring at each end, and the external collar or ring opposite the junction of the two contiguous pieces of the rod when in proper connection. Fig. 2 is a view of the end of the adjoining upper piece of a fishing-rod with the stud to pass into the groove or slot in the tapered tube and a bore or socket to receive the pin or wire projecting from the end of the lower piece. Fig. 3 is a longitudinal section of the two adjoining pieces of a fishing-rod jointed together and of the tapered tube connecting them, and Fig. 4 is a view of the two adjoining pieces of a fishing-rod jointed together and inclosed within a tapered tube as when in use.

*a* is a double spiral metal band in the form of a tapered tube and prolonged with a plain tube, *a'*.

*b b* are the external terminal ferrules or rings at the ends of *a* and *a'*.

*c* is a collar or ring placed externally opposite the junction of the contiguous pieces of the rod when in proper connection.

*d* is the groove or slot in the tapered tube *a'* to receive the stud.

*e* is the upper piece of the rod *f*, and *g* is a pin or wire projecting from the end of the lower piece and fitting into the bore or socket in the end of *h*, the higher piece of the fishing-rod.

Having now particularly described and ascertained the nature of my said invention and in what manner the same is to be performed, I declare that what I claim is—

1. A joint for fishing-rods the body of which consists of a spiral metal band connected to collars or rings at the ends, substantially as described.

2. A joint for fishing-rods, consisting of a spiral metal band arranged in the form of a tapered tube with a plain tube connected to the end thereof, substantially as described.

3. A joint for fishing-rods, consisting of a spiral metal band arranged in the form of a tapered tube having rings at the ends thereof and a collar sliding upon said tube, substantially as described.

4. The combination, with the sections of a fishing-rod, of a joint therefor consisting of a spiral metal band arranged in the form of a tapered tube, and having rings at the ends thereof and provided with a slot to engage a stud on the end of a pole-section, substantially as described.

5. The combination, with the sections of a fishing-rod one of the ends of which is provided with a recess and the other with a pin adapted to fit such recess, of a joint composed of a spiral metal band connected to rings at its ends, substantially as described.

In testimony whereof I have signed my name to this specification in the presence of two subscribing witnesses.

THOMAS KIRKER.

Witnesses:
HUGH HYNDMAN,
JNO. D. COOKE.